Dec. 9, 1958 V. E. ACKLES 2,863,379
MEANS FOR DELIVERING BODIES OF RAW DOUGH TO A BODY OF
HOT FAT IN A DOUGH FRYING MACHINE
Filed March 19, 1956 2 Sheets-Sheet 1
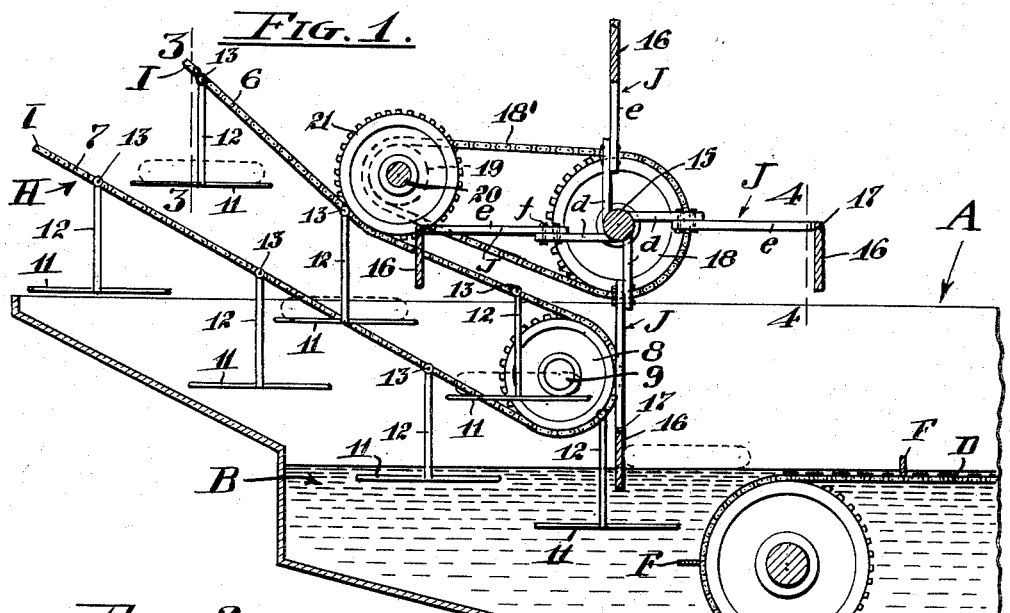
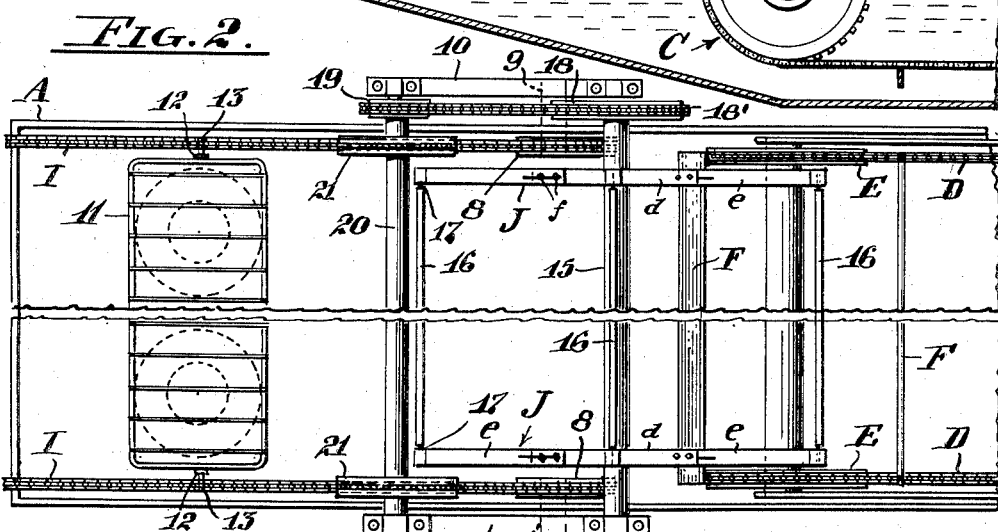
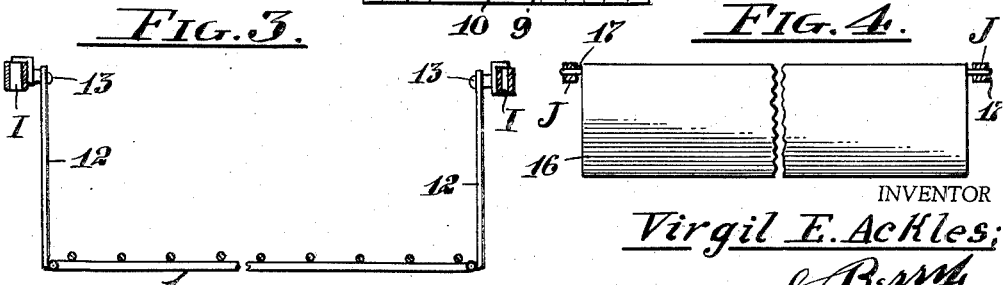
INVENTOR
*Virgil E. Ackles;*
BY
ATTORNEY

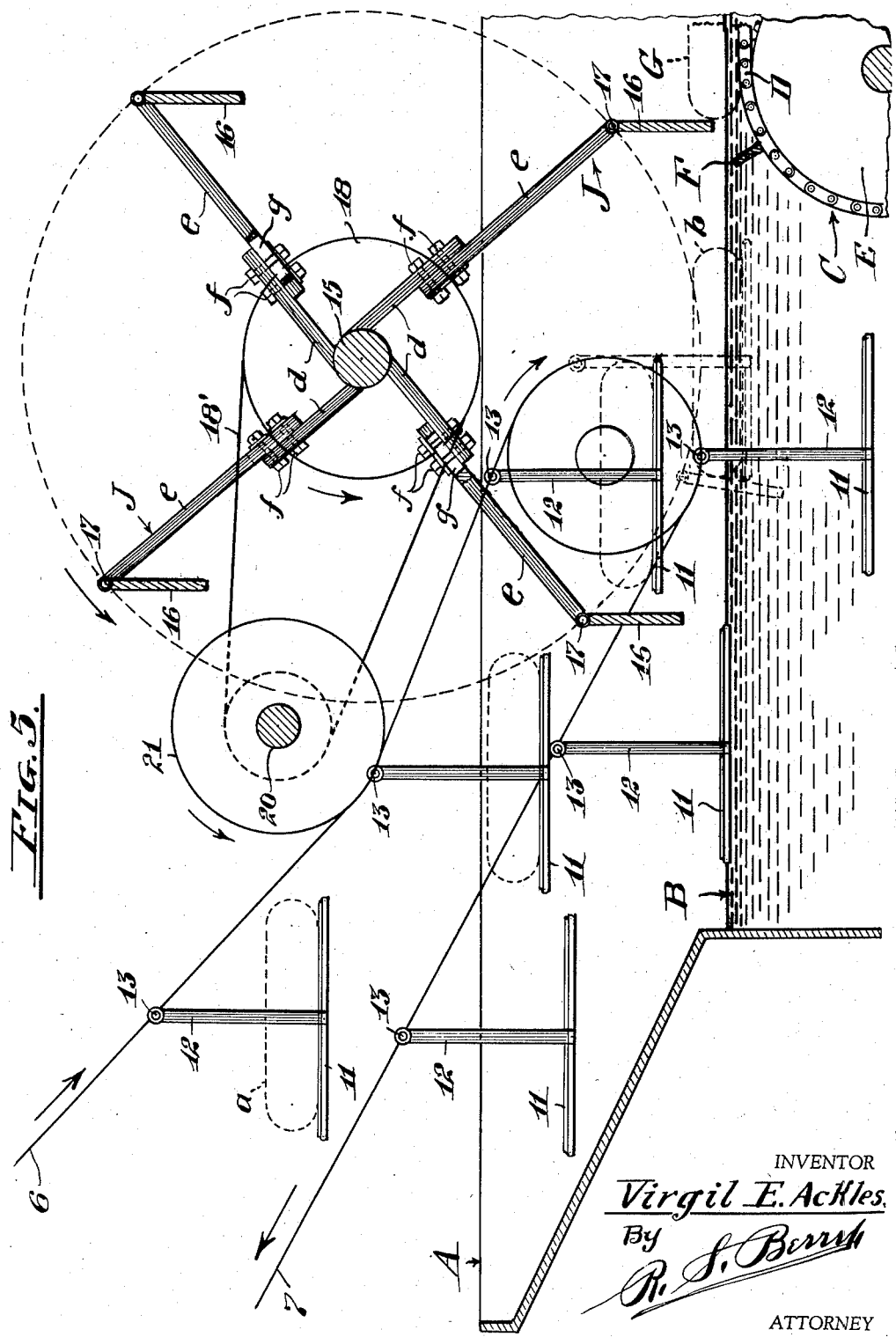

United States Patent Office 2,863,379
Patented Dec. 9, 1958

2,863,379

MEANS FOR DELIVERING BODIES OF RAW DOUGH TO A BODY OF HOT FAT IN A DOUGH FRYING MACHINE

Virgil E. Ackles, Los Angeles, Calif.

Application March 19, 1956, Serial No. 572,497

3 Claims. (Cl. 99—405)

This invention relates to hot fat frying machines utilized in the commercial production of fried dough bodies such as doughnuts, coffee cakes and the like, and particularly pertains to a mechanism for delivering initially molded raw dough bodies from a conveyor thereof into a floating position upon the surface of a body of hot frying liquid in readiness for engagement by a second conveyor whereby the floating dough bodies are advanced over the surface of the hot liquid and thereby subjected to a cooking action in the well known manner.

The primary object of the invention is to provide a dough body transfer mechanism for the purpose specified in combination with an endless conveyor embodying a series of dependent dough supporting trays of a means, construction and arrangement, whereby dough bodies carried on the trays may be transferred therefrom in their upright position and without appreciable impact into a floating position on the surface of a body of frying liquid and in a manner to minimize if not prevent material deformation of the soft and yieldable dough bodies.

With the foregoing objects in view together with such other objects and advantages as may subsequently appear, the invention resides in the parts and in the combination, construction and arrangement of parts hereinafter described and claimed, and illustrated by way of example in the accompanying drawings in which:

Fig. 1 is a view in section and elevation of the dough transfer mechanism with portions removed showing it as applied;

Fig. 2 is a plan view with portions broken away;

Fig. 3 is a detail in section and elevation taken on the line 3—3 of Fig. 1 depicting one of the depending dough body supporting trays;

Fig. 4 is a detail in section and elevation taken on the line 4—4 of Fig. 1 depicting a dough body ejector blade embodied in the machine; and Fig. 5 is a schematic diagram of the mechanism illustrating the mode of operation thereof.

Referring to the drawings more specifically A indicates generally an open topped tank containing a body B of frying liquid and equipped with a horizontally extending endless conveyor C embodies a pair of endless chains D—D carried on sprocket wheels E—E and submerged in the body of liquid B. The chains D—D carry and are connected together by a series of transverse slats F projecting upwardly from the upper leads of the chains D—D and positioned for abutting engagement with floating dough bodies G carried on the surface of the liquid body B as shown in Fig. 5 to effect advance of such dough bodies on the surface of the body B to subject the dough bodies to a frying action as is common in machines for frying doughnuts and the like.

Arranged at one end of the reservoir A in advance of the conveyor C is an endless conveyor H embodying a pair of parallel sprocket chains I—I each of which comprises upper and lower leads 6—7, and which sprocket chains pass around idler sprocket wheels 8—8 on stud shafts 9—9 carried on frames 10—10, the sprocket wheels 8—8 being arranged in the tank A with the lower leads 7 of the chains leading from under the wheels 8—8 disposed close to but spaced from the surface of the liquid body B. The upper portion of the endless conveyor, not shown, is supported and engaged by conventional driving mechanism whereby the conveyor is operated to advance the upper leads 6—6 of the chains downwardly into the tank A while the lower leads 7 thereof move upwardly away therefrom. The portions of the endless conveyor H leading into the tank A extend at an inclination to the horizontal to pass over an end of the tank and into the latter in longitudinal relation thereto.

Mounted on the conveyor chains I—I is a series of equi-spaced dependent dough supporting trays 11 rigidly fixed at their ends on hangers 12—12 pivotally connected at 13 at their upper ends to the chains I—I to swing thereon.

Extending transversely above the tank A is a horizontal shaft 15 the axis of which is in parallelism with the axes of the stud shafts 9—9 in upwardly and forwardly spaced relation thereto and which shaft is revolubly mounted at its ends in suitable bearings on the frames 10—10. Carried on the shaft 15 are fixed arms J projecting in general radial relation to the shaft 15, there being a series of four of such arms mounted on each end portion of the shaft 15 with the arms in one series thereof disposed opposite and aligned with the arms in the other series thereof. The arms J are arranged on the shaft 15 so that on rotation of the latter they will pass between the lower end portions of the sprocket chains I—I. The arms J are of corresponding length and pivotally mounted on the outer ends of such arms are depending blades 16 particularly shown in Fig. 4; the blades 16 being carried on pivot pins 17 on the outer upper corners of the blade and freely turnable on the outer ends of the arms J whereby the blades 17 normally extend vertically while being advanced with the arms J on rotation of the shaft 15. The blades 16 are formed and arranged so that on being advanced with the arms J their lower marginal portions will dip into the surface of the liquid body B.

Fixed on one end of the shaft 15 is a sprocket wheel 18 around which passes a sprocket chain 18' leading around a sprocket wheel 19 on a shaft 20, which latter extends transversely above the tank A and above the upper leads 6 of the conveyor chains I—I and has its ends revolubly mounted in suitable bearings on the frames 10—10. The arms J are adjustable longitudinally to vary the positions of their outer end and their consequent path of travel as occasion may require, for which purpose each of the arms J embodies an inner end member $d$ fixed to the shaft 15 and an outer end member $e$ which member $e$ overlies the inner end member $d$ and is secured thereto by bolts $f$ which pass through the member $d$ and through a slot $g$ in the member $e$ and are tightened to clamp the members $e$ and $d$ tightly together in longitudinal alignment. The slot $g$ permits longitudinal adjustment of the member $e$ relative to the member $d$.

Mounted on the shaft 20 are complementary sprocket wheels 21—21 which are engaged on their undersides by the upper leads 6 of the sprocket chains I—I, whereby, on downward advance of the leads 6 rotation of the shaft 15 will be effected through the drive afforded by the sprocket wheels 21, shaft 20, sprocket wheel 19, sprocket chain 18' and sprocket wheel 18, the recited transmission elements being arranged so that the shaft 15 will rotate counter to the advance of the upper leads 6 of the sprocket chains I—I. The swinging dough supporting trays 11 and the swinging blades 16 on the arms J are so arranged and timed in their movement relative to each other that in their respective paths of travel a tray 11 moving downwardly around the sprocket wheels 9—9 will advance forwardly of a downwardly moving blade 16 so that as a dough carrying tray is passed downwardly into the liquid body B and leaves the dough bodies floating on the latter, the lower margin of the adjacent blade 16 will advance into the liquid rearward of the floating bodies and will pass over the then downwardly and rearwardly moving tray 11.

In the operation of the invention formed bodies of dough are initially positioned on the trays 11 being advanced on the upper leads 6 of the conveyor H as indicated in dotted lines $a$ in the drawings, the bodies of dough being thus conveyed on the trays 11 until deposited on the surface of the cooking liquid B as indicated by the dotted lines $b$ in Figs. 1 and 5. Advance of the upper leads 6 of the conveyor chains I—I effects rotation of the shaft 15 and the arms J to bring an advancing blade 16 into abutting relation with the rear marginal portion of the bodies of dough $b$ above described and as indicated in Fig. 5, whereupon the advancing swinging blade 16 will act to shove the dough bodies forward as indicated at G in Fig. 5 in position for engagement by a slat F on the conveyor C whereby the latter, which is operated from any suitable source of power, will effect advance of the dough bodies floating on the surface of the cooking liquid B.

By the recited construction and mode of operation transfer of the dough bodies from their supporting trays 11 on the conveyor H into position to be advanced by the conveyor C will be effected without subjecting the dough bodies to forcible impact such as would effect material distortion or disfigurement thereof.

While I have shown and described a specific embodiment of the invention, I do not limit myself to the exact details of construction set forth, and the invention embraces such changes, modifications and equivalents of the parts and their formation and arrangement as come within the purview of the appended claims.

I claim:

1. In a dough body cooking machine of the type embodying an open topped tank containing a body of cooking liquid, a slatted endless conveyor in said tank arranged and operable to advance floating dough bodies on the surface of said liquid, a second endless conveyor fitted with a series of dependent dough carrying trays arranged to be successively submerged in the liquid to deliver dough bodies carried thereon to the surface of such liquid; a rotary shaft extending horizontally across said tank, a series of substantially radial arms on said shaft, a series of dependent blades pivotally suspended from the outer ends of said arms, means for rotating said shaft; said shaft, arms and blades being arranged so that on rotation of said shaft said blades will be brought into abutting contact with floating dough bodies as they are delivered by said trays to the surface of the frying liquid and then effect advance of said dough bodies into a position for operative engagement by said slatted conveyor.

2. The structure called for in claim 1 in which said shaft driving means comprises a wheel having driving engagement with said second conveyor, and driving connections between said wheel and said shaft whereby the latter is driven in timed relation to said second conveyor.

3. In a dough cooking machine embodying an open topped tank containing a body of hot frying liquid and equipped with a slatted endless conveyor adapted to advance dough bodies floated upon the surface of the liquid; a pair of axially aligned sprocket wheels vertically arranged in said tank with the peripheries thereof in slightly spaced relation to the surface of said liquid, said sprocket wheels being disposed at a point in said tank in advance of the leading end portion of said slatted conveyor, sprocket chains leading around said sprocket wheels approaching said wheels at a downward inclination over an end of the tank and in the direction of the length of the latter, a series of dependent hangers pivotally supported on said sprocket chains arranged in equi-spaced relation to each other, dough supporting trays fixedly carried on the lower ends of said hangers, said hangers and trays being adapted to be advanced successively by said chains around said sprocket wheels and being formed and arranged so that on passing beneath said sprocket wheels said hangers and trays will be substantially submerged in the liquid whereby dough bodies then carried on the trays will be deposited in floating relation upon the surface of the liquid, a revoluble horizontally extending shaft overlying said tank transversely thereof, said shaft being disposed in advance of said slatted conveyor and on a plane spaced above said sprocket wheels, means for driving said shaft counter to the direction of rotation of said sprocket wheels and the sprocket chains engaged thereby when advancing said hangers and trays, said means including a toothed wheel engageable with the upper lead of one of said chains, a revolubly mounted shaft carrying said toothed wheel and driving connections between said shaft and said first named shaft; a plurality of arms carried by said first named shaft extending substantially radially therefrom, there being a series of said arms correspondingly arranged adjacent the ends of said shaft, said arms being disposed so that the outer end portions thereof will pass between said pair of sprocket wheels and chains with their outer ends advancing proximate the surface of said liquid in spaced relation thereto, and a vertically depending blade pivotally connected at its upper end portions to the outer ends of opposed pairs of said arms, said blades being adapted to advance against the rear portions of dough bodies as they are deposited upon the surface of said liquid from said trays and to effect advance of said bodies on the surface of the liquid to a position for engagement by said slatted conveyor.

References Cited in the file of this patent

UNITED STATES PATENTS

| | | |
|---|---|---|
| 1,389,976 | Patten | Sept. 6, 1921 |
| 2,042,262 | Lagaard | May 26, 1936 |
| 2,055,639 | Scheibel | Sept. 29, 1936 |